(12) United States Patent
Shen

(10) Patent No.: US 9,110,636 B2
(45) Date of Patent: Aug. 18, 2015

(54) PORTABLE ELECTRONIC DEVICE WITH A SUPPORTING STRUCTURE FOR SUPPORTING A DISPLAY MODULE

(71) Applicant: Wistron Corporation, New Taipei (TW)

(72) Inventor: WenHua Shen, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 40 days.

(21) Appl. No.: 14/155,379

(22) Filed: Jan. 15, 2014

(65) Prior Publication Data

US 2015/0043144 A1   Feb. 12, 2015

(30) Foreign Application Priority Data

Aug. 12, 2013   (CN) .......................... 2013 1 0349573

(51) Int. Cl.
*H05K 5/00* (2006.01)
*G06F 1/16* (2006.01)

(52) U.S. Cl.
CPC .................................. *G06F 1/1679* (2013.01)

(58) Field of Classification Search
CPC .... G06F 1/1616; G06F 1/1637; G06F 1/1681
See application file for complete search history.

(56) References Cited

U.S. PATENT DOCUMENTS

| | | | |
|---|---|---|---|
| 6,971,622 B2* | 12/2005 | Ziegler et al. | 248/454 |
| 7,758,009 B1* | 7/2010 | Chang | 248/460 |
| 8,605,431 B2* | 12/2013 | Cheng et al. | 361/679.56 |
| 2006/0145046 A1* | 7/2006 | Liou et al. | 248/455 |

FOREIGN PATENT DOCUMENTS

| | | |
|---|---|---|
| TW | M430134 | 5/2012 |
| TW | 201222206 | 6/2012 |

* cited by examiner

*Primary Examiner* — Robert J Hoffberg
*Assistant Examiner* — Hung Dang
(74) *Attorney, Agent, or Firm* — Winston Hsu; Scott Margo

(57) ABSTRACT

A portable electronic device includes a host module, a display module, a pivoting structure connected to the host module and the display module and a supporting structure connected to the display module for supporting the display module on a supporting surface. The supporting structure includes a supporting portion for contacting against the supporting surface and two supporting rods. Two ends of the two supporting rods are connected to two ends of the supporting portion respectively, and the other ends of each rod are rotatably connected to two side portions of the display module respectively, so that the supporting structure rotates relative to the display module. A sliding slot is formed on the other end of each supporting rod, and parts of the two side portions of the display module are installed inside the two sliding slots, so that the two supporting rods move relative to the display module.

11 Claims, 12 Drawing Sheets

PORTABLE ELECTRONIC DEVICE WITH A SUPPORTING STRUCTURE FOR SUPPORTING A DISPLAY MODULE

BACKGROUND OF THE INVENTION

1. Field of the Invention

The present invention relates to a portable electronic device, and more specifically, to a portable electronic device with a supporting structure for supporting a display module.

2. Description of the Prior Art

In modern computer industry, a notebook computer with a touch function becomes more popular, and therefore a user can touch a display module to input desired commands directly. However, the display module of the notebook computer is pivotally connected to a host module of the notebook computer, so that as the user touches the touch display module, the display module is swayed easily due to a force applied by a finger of the user, resulting in bad feeling of operation. Therefore, it is an important issue to design a supporting structure for fixing the display module stably as the user performs a touch operation.

SUMMARY OF THE INVENTION

The present invention is to provide a supporting structure for supporting a touch display module stably to solve above problems.

According to the disclosure, a portable electronic device includes a host module, a display module, a pivoting structure and a supporting structure. The pivoting structure is connected to the host module and the display module, and the pivoting structure is for pivoting the display module relative to the host module. The supporting structure is connected to the display module and for supporting the display module on a supporting surface. The supporting structure includes a supporting portion and two supporting rods. The supporting portion is for contacting against the supporting surface. Two ends of the two supporting rods are connected to two ends of the supporting portion respectively, and the other ends of the two supporting rods are rotatably connected to two side portions of the display module respectively, so that the supporting structure rotates relative to the display module, a sliding slot is formed on the other end of each supporting rod, and parts of the two side portions of the display module are installed inside the two sliding slots, so that the two supporting rods move relative to the display module.

According to the disclosure, two connecting holes are formed on the two side portions respectively, two perforations are formed on two ends of each sliding slot respectively, the supporting structure further comprises two pivoting components, and each pivoting component passes through the corresponding connecting hole and the corresponding perforation, so that the supporting structure slides and rotates relative to the display module.

According to the disclosure, an aperture is further formed on each side portion of the display module and communicated to the corresponding connecting hole, and each pivoting component includes a cylindrical portion, a stopping portion and a driving portion. The cylindrical portion passes through the corresponding perforation and the corresponding connecting hole. The stopping portion is disposed on the cylindrical portion. The driving portion is connected to an end of the cylindrical portion, and the driving portion drives the cylindrical portion and the stopping portion to pass through the corresponding perforation, so as to pass through the corresponding connecting hole and the corresponding aperture respectively after the stopping portion is aligned with the corresponding aperture.

According to the disclosure, a fan-shaped groove is formed on each connecting hole, after the cylindrical portion and the stopping portion pass through the corresponding connecting hole and the corresponding aperture respectively, the driving portion is for driving the cylindrical portion and the stopping portion to rotate, so that the stopping portion rotates to contact against the fan-shaped groove, so as to prevent the pivoting component from separating from the display module and the supporting rod.

According to the disclosure, each pivoting component further comprises a pressing portion, and the supporting structure further includes two bases and two resilient components. The two bases are disposed inside the display module, and a column is disposed on each base. Each resilient component sheathes the corresponding column, and each resilient component pushes the pressing portion of the corresponding pivoting component as the corresponding driving portion drives the stopping portion to rotate from the fan-shaped groove to align with the aperture, so as to separate the corresponding pivoting component from the display module and the supporting rod.

According to the disclosure, each pivoting component further comprises a locking portion disposed on the cylindrical portion, the supporting rod slides relative to the corresponding pivoting component as the locking portion is parallel to the corresponding sliding slot, and the supporting rod is not able to slide relative to the corresponding pivoting component as the locking portion is not parallel to the corresponding sliding slot.

According to the disclosure, the supporting structure further comprises a frame, and the two supporting rods are movably connected to two ends of the frame.

According to the disclosure, the portable electronic device further includes a plurality of fixing components for fixing the frame on the display module.

According to the disclosure, two locating blocks are formed on the frame, at least one locating slot is further formed on the other end of each supporting rod, and the two locating blocks are engaged with the at least one locating slot of the two supporting rods respectively as the two supporting rods rotate relative to the frame to a specific angle, so as to fix the two supporting rods on the frame.

According to the disclosure, two engaging slots are further formed on the two supporting rods, and two engaging blocks are formed on the two side portions for engaging with the two engaging slots, so as to fix the two supporting rods on the display module.

According to the disclosure, wherein the supporting structure further comprises at least one slip-resistant component installed on the supporting portion for prevent the supporting portion from slipping relative to the supporting surface.

The portable electronic device has the supporting structure for supporting the display module on the two side portions of the display module. As the portable electronic device is in a using state, the two supporting rods of the supporting structure can rotate relative to the pivoting components, so that the supporting portion of the supporting structure contacts against the supporting surface for supporting the display module. Moreover, the sliding slot and a plurality of the locating slots are formed on each supporting rod, so that the two supporting rods can move relative to the pivoting components and rotate to be fixed in a plurality of specific angles, so as to fix the display module in the plurality of specific angles. As a result, it solves the conventional problem that the display module is pivotally connected to the host module, so that as the user touches the touch display module, the display module is swayed due to a force applied by a finger of the user, resulting in bad feeling of operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
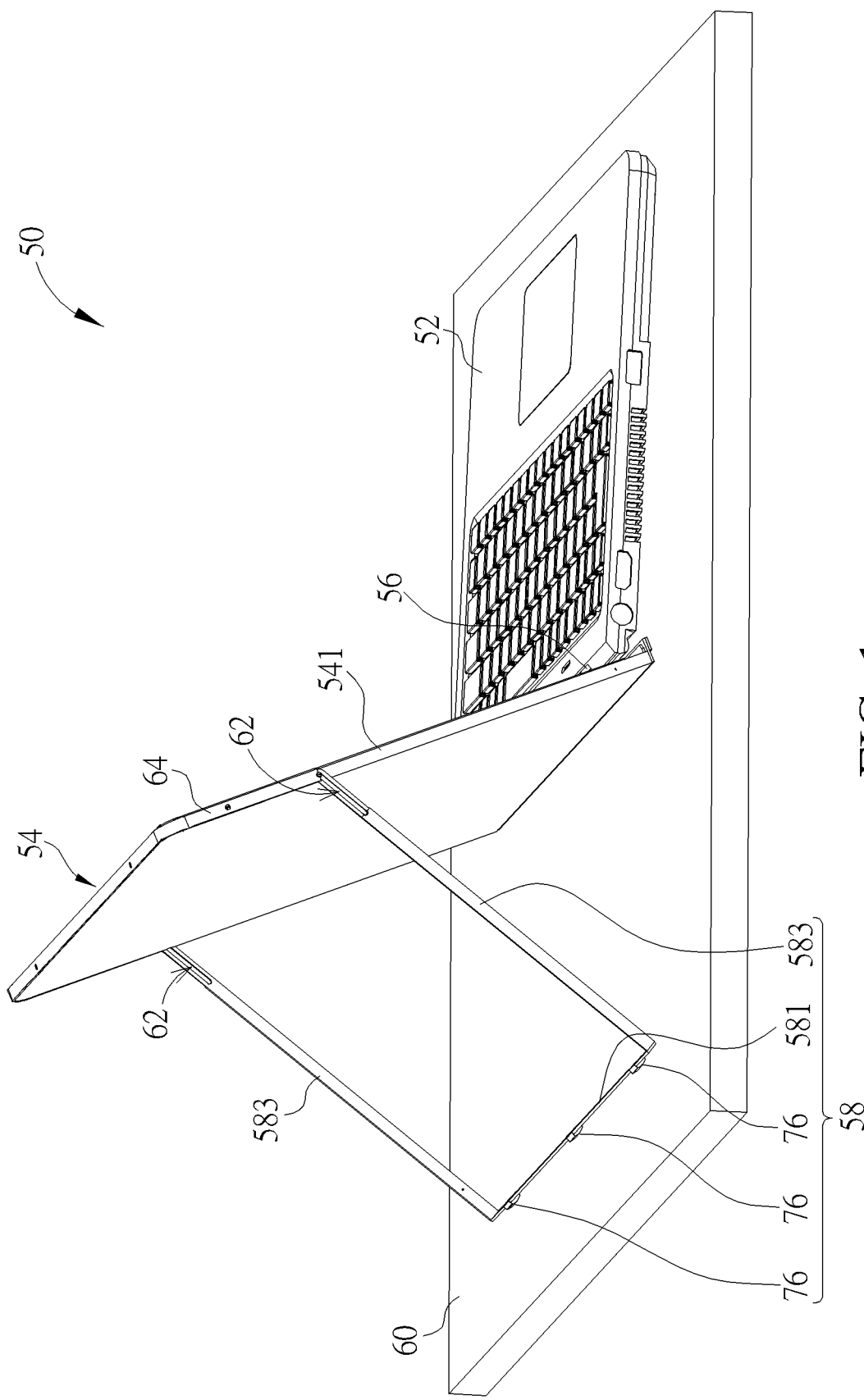
FIG. 1 is a diagram of a portable electronic device according to an embodiment of the present invention.

Please refer to FIG.1. FIG.1 is a diagram of a portable electronic device 50 according to an embodiment of the present invention. The portable electronic device 50 of the present invention can be a notebook computer. The portable electronic device 50 includes a host module 52, a display module 54, a pivoting structure 56 and a supporting structure 58. The host module 52 is for controlling operation of the portable electronic device 50, and the host module 52 includes various electronic components, such as a CPU, a hard drive, a fan, a memory, an expansion card, and so on. The display module 54 is for displaying various information of the portable electronic device 50, and the display module 54 can be a touch display module, so that a user can touch the touch display module to input touch commands. The pivoting structure 56 is connected to the host module 52 and the display module 54. The pivoting structure 56 is for pivoting the display module 54 relative to the host module 52. The supporting structure 58 is connected to the display module 54 and for supporting the display module 54 on a supporting surface 60. The supporting structure 58 includes a supporting portion 581 and two supporting rods 583, and the supporting portion 581 and the two supporting rods 583 can form a U-shaped body. The supporting portion 581 is for contacting against the supporting surface 60. Two ends of the two supporting rods 583 are connected to two ends of the supporting portion 581 respectively, and the other ends of the two supporting rods 583 are rotatably connected to two side portions 541 of the display module 54, so that the supporting structure 58 can rotate relative to the display module 54. A sliding slot 62 is formed on the other end of each supporting rod 583, and parts of the two side portions 541 of the display module 54 are installed inside the two sliding slots 62, so that the two supporting rods 583 can move relative to the display module 54.

Figure 2:
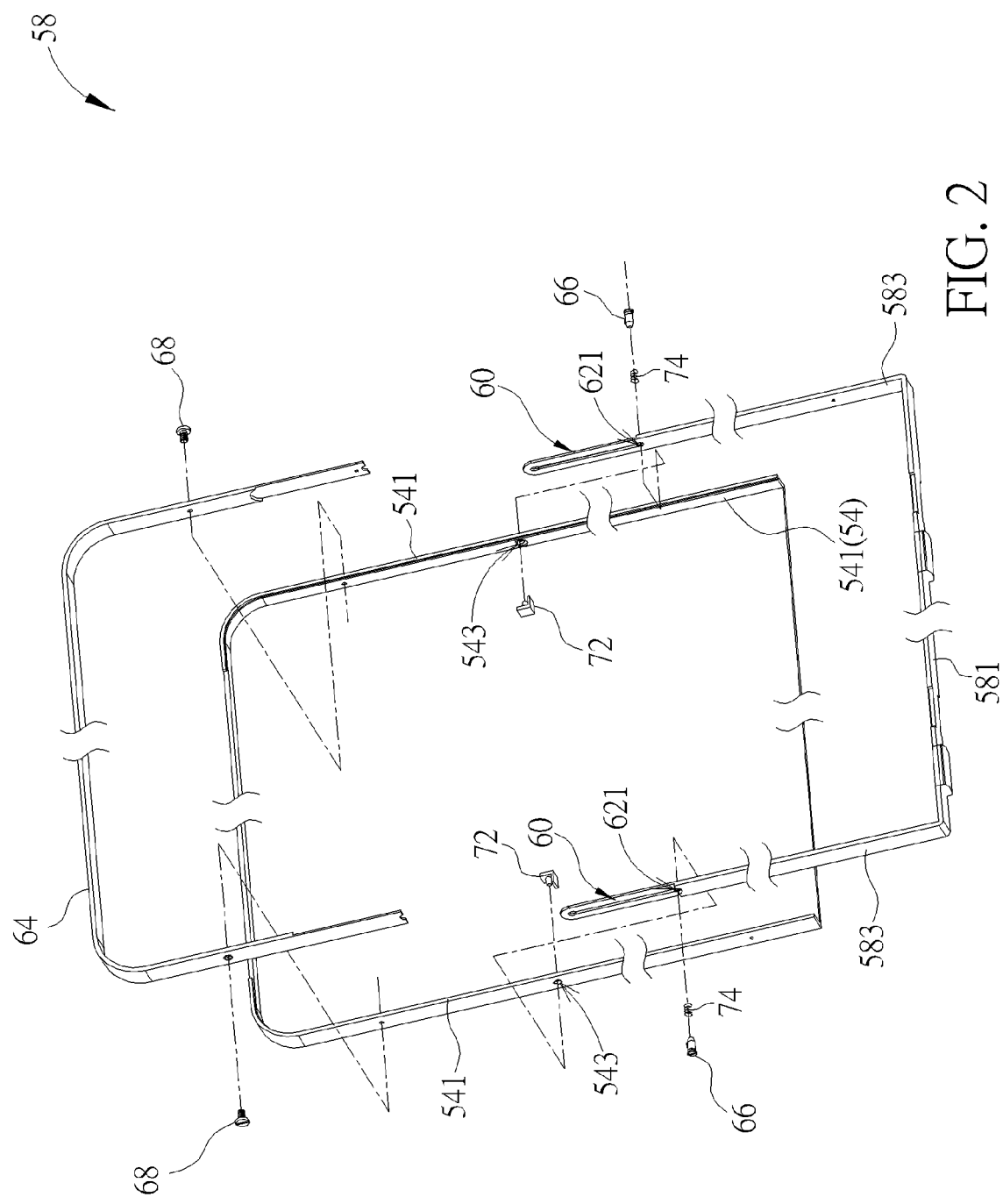
FIG. 2 is a partially exploded diagram of a display module and a supporting structure according to the embodiment of the present invention.
Figure 3:
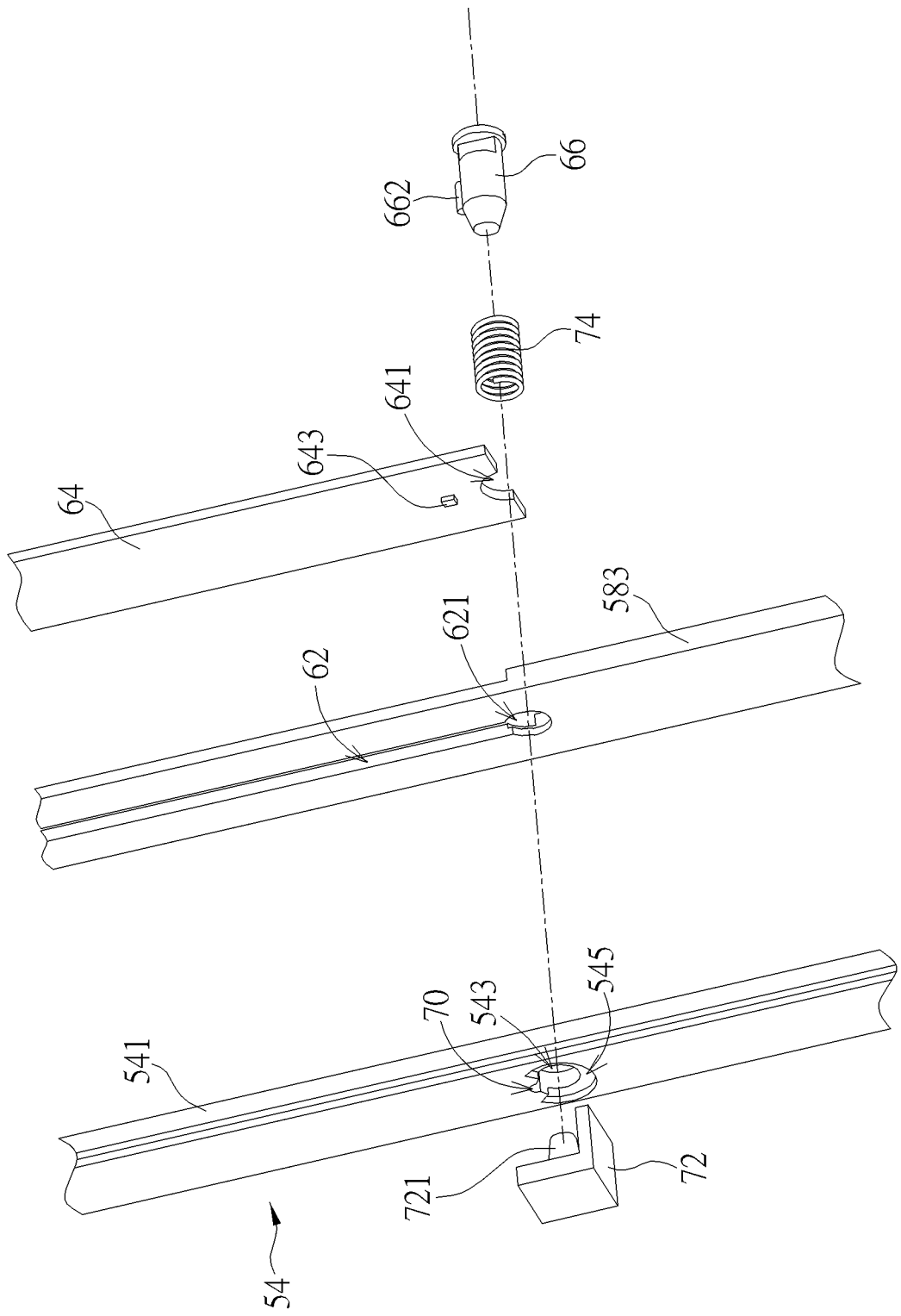
FIG. 3 and FIG. 4 are enlarged diagrams of FIG. 2 according to the embodiment of the present invention.
Figure 4:
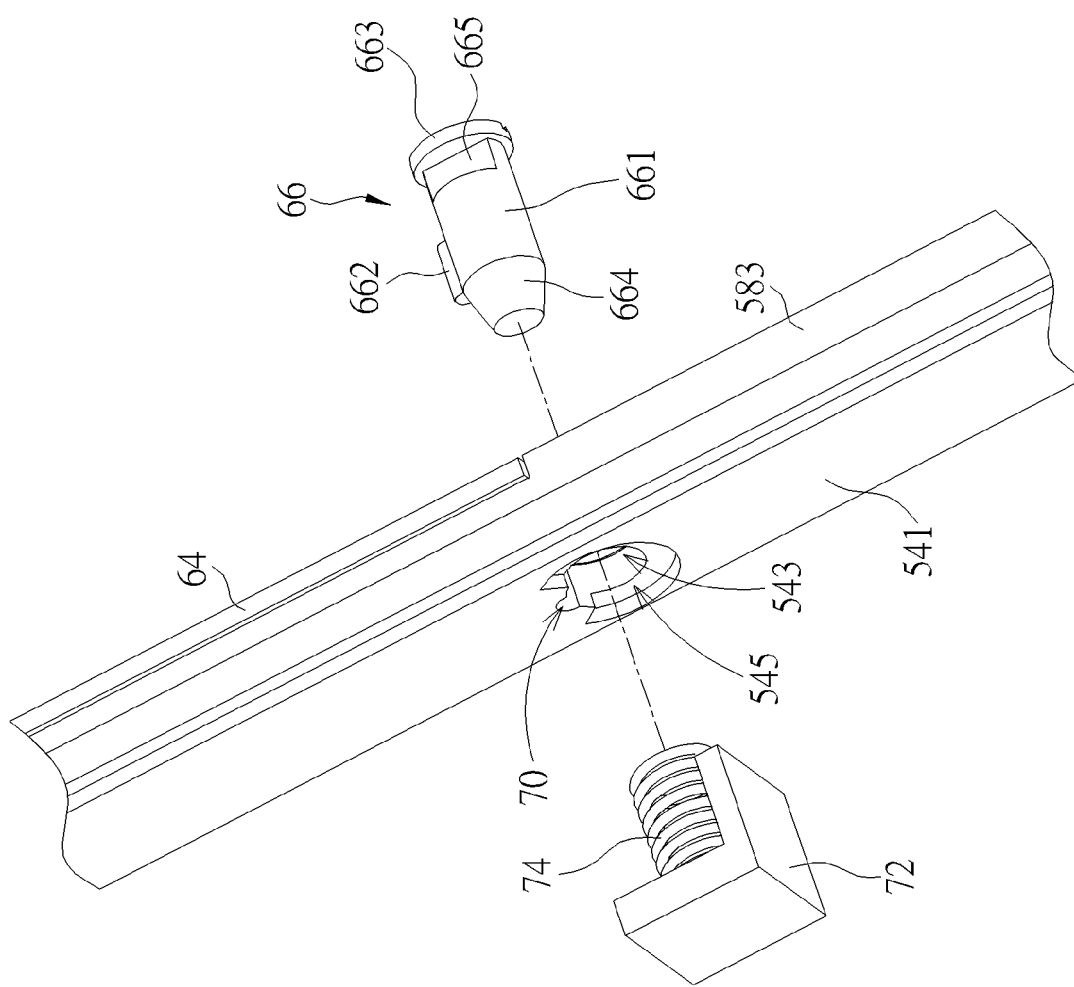

Please refer to FIG. 2 to FIG. 4. FIG. 2 is a partially exploded diagram of the display module 54 and the supporting structure 58 according to the embodiment of the present invention. FIG. 3 and FIG. 4 are enlarged diagrams of FIG. 2 according to the embodiment of the present invention. As shown in FIG. 2, the supporting structure 58 further includes a frame 64 and two pivoting components 66. The frame 64 can be a decorative structure. The two supporting rods 583 are movably connected to two ends of the frame 64 by the two pivoting components 66. Furthermore, in this embodiment, the portable electronic device 50 further includes a plurality of fixing components 68 for fixing the frame 64 on the display module 54. For example, the fixing component 68 can be a screw component for screwing the frame 64 onto the display module 54. As shown in FIG. 2 to FIG. 4, a connecting hole 543 and an aperture 70 communicated to the connecting hole 543 are formed on each side portion 541 of the display module 54, and two perforations 621 are formed on two ends of each sliding slot 62 respectively. A semicircular hole 641 can also be formed on the frame 64 correspondingly. Each pivoting component 66 passes through the corresponding semicircular hole 641, the corresponding perforation 621 and the corresponding connecting hole 543 so that the supporting structure 58 can slide and rotate relative to the display module 54. Each pivoting component 66 includes a cylindrical portion 661, a stopping portion 662, a driving portion 663, a pressing portion 664 and a locking portion 665 disposed on the cylindrical portion 661. The cylindrical portion 661, the stopping portion 662, the driving portion 663, the pressing portion 664 and the locking portion 665 can be integrally formed. The cylindrical portion 661 passes through the corresponding perforation 621 and the corresponding connecting hole 543. The stopping portion 662 is disposed on the cylindrical portion 661. The driving portion 663 is connected to an end of the cylindrical portion 661, and the driving portion 663 is for driving the cylindrical portion 661 and the stopping portion 662 to pass through the corresponding perforation 621, so as to pass through the corresponding connecting hole 543 and the corresponding aperture 70 respectively after the stopping portion 662 is aligned with the corresponding aperture 70. In addition, an I-shaped screw slot can be formed on the driving portion 663, so that the user can rotate the driving portion 663 by a tool, such as a screwdriver, so as to drive the cylindrical portion 661 and the stopping portion 662 to rotate.

Figure 5:
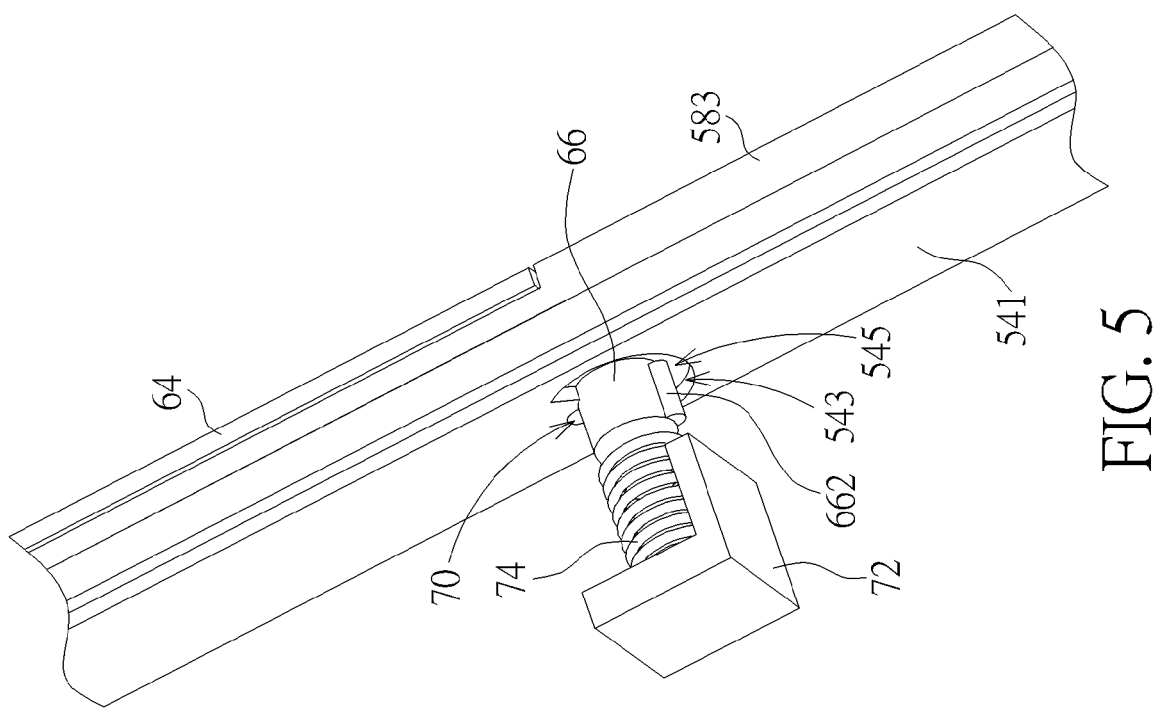
FIG. 5 is a diagram illustrating that a pivoting component passes through a connecting hole according to the embodiment of the present invention.

Please refer to FIG. 3 to FIG. 5. FIG. 5 is a diagram illustrating that the pivoting component 66 passes through the connecting hole 543 according to the embodiment of the present invention. In this embodiment, a fan-shaped groove 545 is formed on each connecting hole 543. After the cylindrical portion 661 and the stopping portion 662 are aligned with the corresponding connecting hole 543 and the corresponding aperture 70 respectively, the user can press downward and then rotate the driving portion 663, so as to drive the cylindrical portion 661 and the stopping portion 662 to pass through the corresponding connecting hole 543 and the corresponding aperture 70 respectively, so that the stopping portion 662 rotates to the fan-shaped groove 545 and contacts against the fan-shaped groove 545. That is, the fan-shaped groove 545 can contact against the stopping portion 662, so as to prevent the pivoting component 66 from separating from the display module 54 and the supporting rod 583.

Moreover, in this embodiment, the supporting structure 58 can further include two bases 72 and two resilient components 74. The two bases 72 are disposed inside the display module 54, and a column 721 is disposed on each base 72. Each resilient component can be a spring and sheathes the corresponding column 721. As the pivoting component 66 passes through the corresponding perforation 621 and the connecting hole 543, the pressing portion 664 of the pivoting component 66 presses the resilient component 74. The pressing portion 664 can be a cone-shaped structure connected to the cylindrical portion 661, so that a part of the pressing portion 664 is sheathed inside the resilient component 74 and presses the resilient component 74 gradually as the pivoting component 66 gets close to the base 72. Then, the resilient component 74 pushes the pressing portion 664 correspondingly, so that the stopping portion 662 contacts against the fan-shaped groove 545 to fix the pivoting component 66. As the pivoting component 66 is to be detached from the display module 54 and the supporting rod 583, the user can rotate the driving portion 663 to drive the stopping portion 662 to rotate from the fan-shaped groove 545 to align with the aperture 70. Then each resilient component 74 provides a recovering force to push the pressing portion 664 of the corresponding pivoting component 66, so as to separate the corresponding pivoting component 66 from the display module 54 and the corresponding supporting rod 583. In addition, a foolproof mark, such as a pit, can be further formed on the driving portion 663, so as to indicate that the pivoting component 66 is in a locking state or a released state as the foolproof mark is aligned with a specific position, notify the user that the pivoting component 66 is fixed on the display module 54 or is in a state capable of separating from the display module 54.

Figure 6:
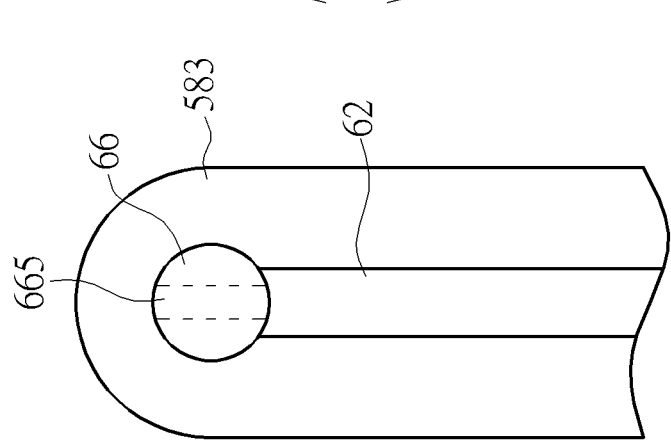
FIG. 6 and FIG. 7 are diagrams illustrating that the pivoting component and a supporting rod are in different states according to the embodiment of the present invention.
Figure 7:
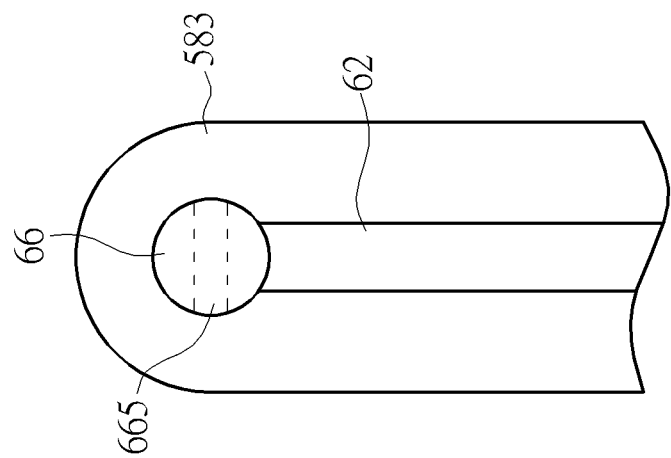

Please refer to FIG. 6 and FIG. 7. FIG. 6 and FIG. 7 are diagrams illustrating that the pivoting component 66 and the supporting rod 583 are indifferent states according to the embodiment of the present invention. As shown in FIG. 6, as the user rotates the driving portion 663 so as to drive the locking portion 665 of the pivoting component 66 to be parallel to the corresponding sliding slot 62, the locking portion 665 is not interfered with the sliding slot 62 at this time, so that the supporting rod 583 can slide relative to the pivoting component 66 in an arrow direction illustrated in FIG. 6. As the user rotates the driving portion 663 to drive the locking portion 665 to be not parallel to the corresponding sliding slot 62, because a length of the locking portion 665 is greater than a width of the sliding slot 62, the locking portion 665 is interfered with the sliding slot 62, so that the supporting rod 583 cannot slide relative to the pivoting component 66 in the arrow direction shown in FIG. 6. Therefore, this structural design can be as a locking mechanism for preventing the supporting rod 583 from moving relative to the pivoting component 66.

Figure 8:
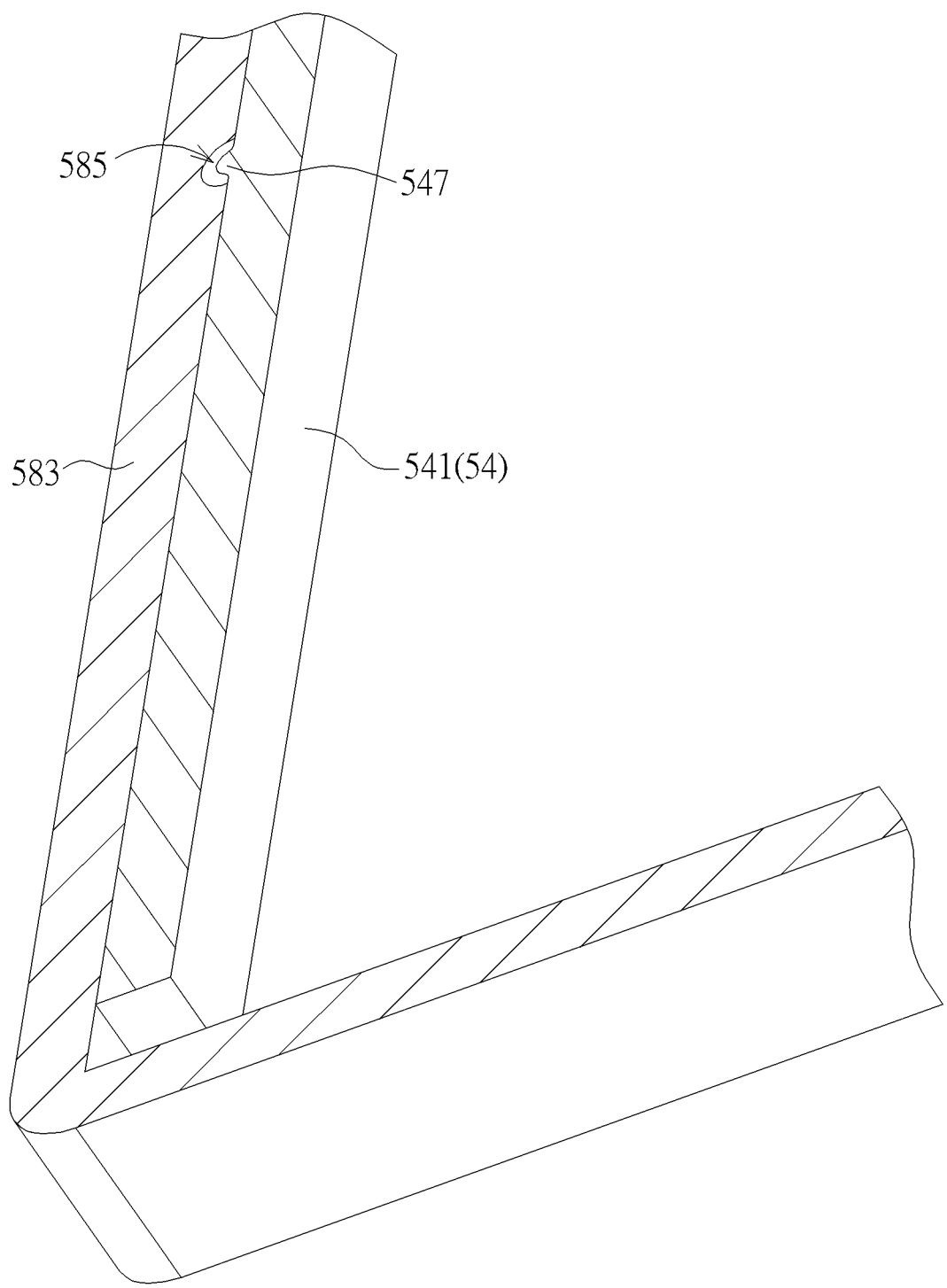
FIG. 8 is an enlarged diagram of the display module and the supporting rod according to the embodiment of the present invention.

Please refer to FIG. 8. FIG. 8 is an enlarged diagram of the display module 54 and the supporting rod 583 according to the embodiment of the present invention. In this embodiment, an engaging slot 585 is formed on each supporting rod 583, and an engaging block 547 is formed on the corresponding side portion 541 of the display module 54. The engaging block 547 can be engaged with the corresponding engaging slot 585, so as to fix the supporting rod 583 on the display module 54. That is, the supporting structure 58 can be fixed on the display module 54 by this structural design as the supporting structure 58 is not used.

Figure 9:
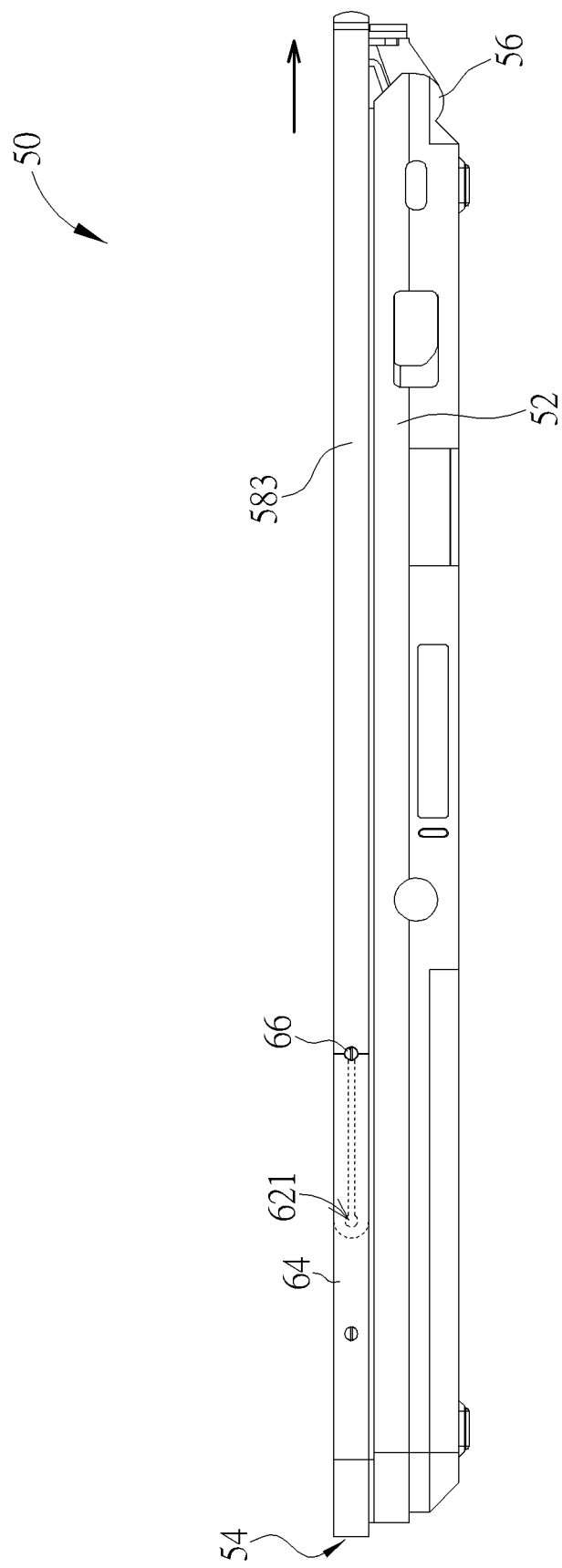
FIG. 9 to FIG. 11 are diagrams of the portable electronic device in different states according to the embodiment of the present invention.
Figure 10:
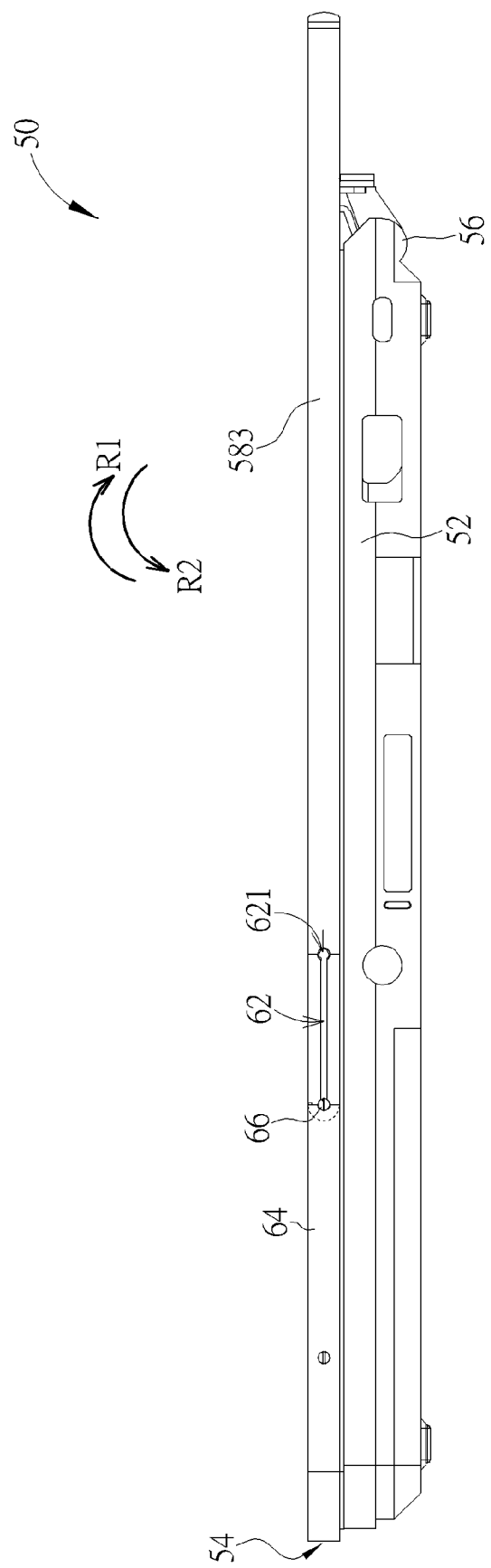
Figure 11:
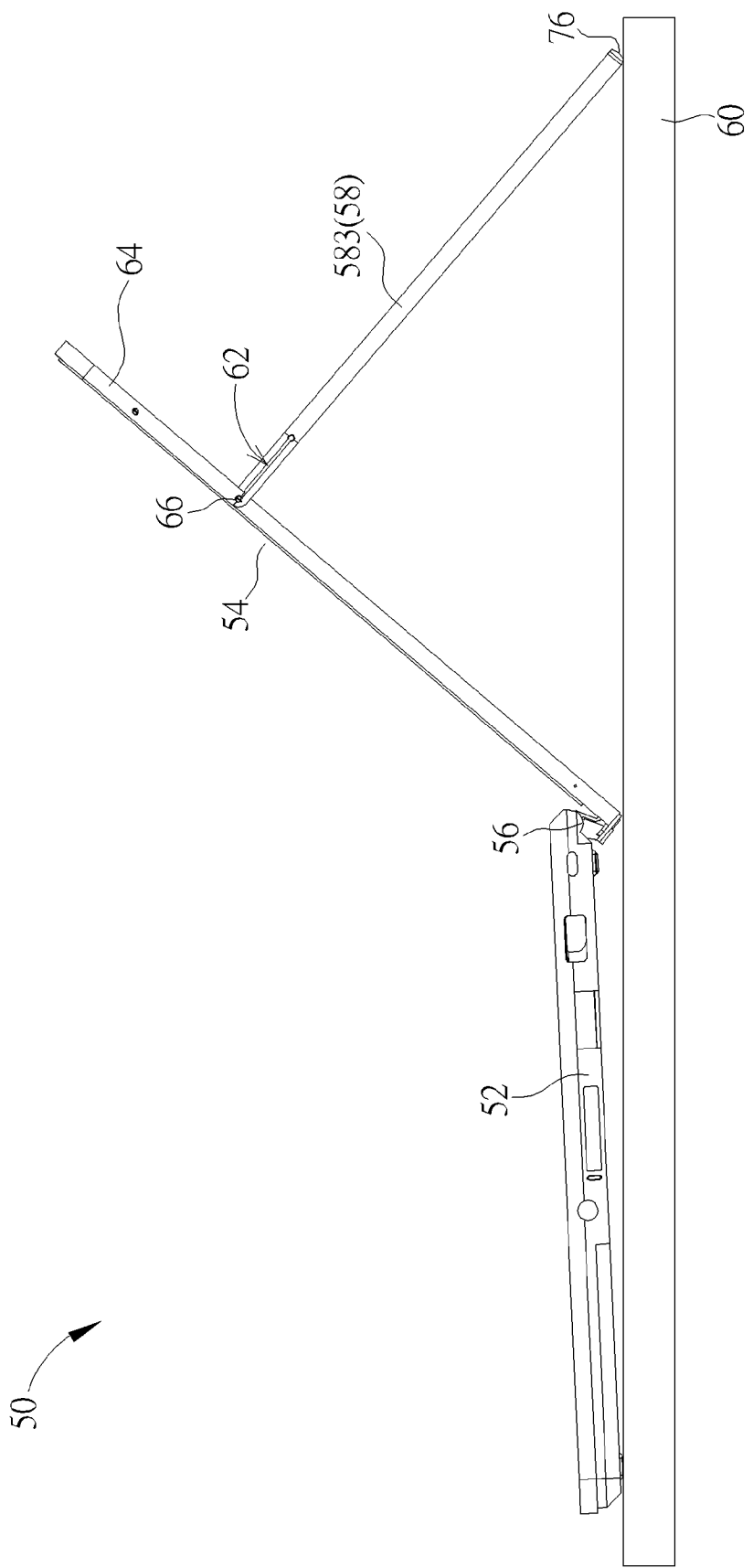

An operation of the supporting structure 58 is described as follows. Please refer to FIG. 3, FIG. 6, FIG. 7 and FIG. 9 to FIG. 11. FIG. 9 to FIG. 11 are diagrams of the portable electronic device 50 in different states according to the embodiment of the present invention. As shown in FIG. 9, the portable electronic device 50 is in a closed state. At this time, the pivoting component 66 is in the perforation 621 of an end of the corresponding sliding slot 62. First, the user can rotate the driving portion 663 to drive the locking portion 665 of the pivoting component 66 to be parallel to the corresponding sliding slot 62, as shown in FIG. 6. Then, the supporting rod 583 of the supporting structure 58 can be pulled in an arrow direction illustrated in FIG. 9, so that the supporting rod 583 moves relative to the pivoting component 66 to a position shown in FIG. 10. At this time, the pivoting component 66 is in the other end of the corresponding sliding slot 62, and a part of the supporting rod 583 is protrude outside the display module 54. Next, the display module 54 rotates relative to the host module 52 in a first rotating direction R1 by the pivoting structure 56, and the supporting rod 583 rotates relative to the pivoting component 66 in a second rotating direction R2. Then, the portable electronic device 50 can be in an open state as shown in FIG. 11. As shown in FIG. 11, the supporting structure 58 is for supporting the display module 54 on the supporting surface 60, so that the supporting structure 58 can support the display module 54 stably when the user touch the display module 54, and therefore the user has better using experience. In addition, as shown in FIG. 1 and FIG. 11, the supporting structure 58 can further include at least one slip-resistant component 76 installed on the supporting portion 581 for prevent the supporting portion 581 from slipping relative to the supporting surface 60, so as to enhance stability of the supporting structure 58 for supporting the display module 54. In this embodiment, the supporting structure 58 can include three slip-resistant components 76, but is not limited to it.

Figure 12:
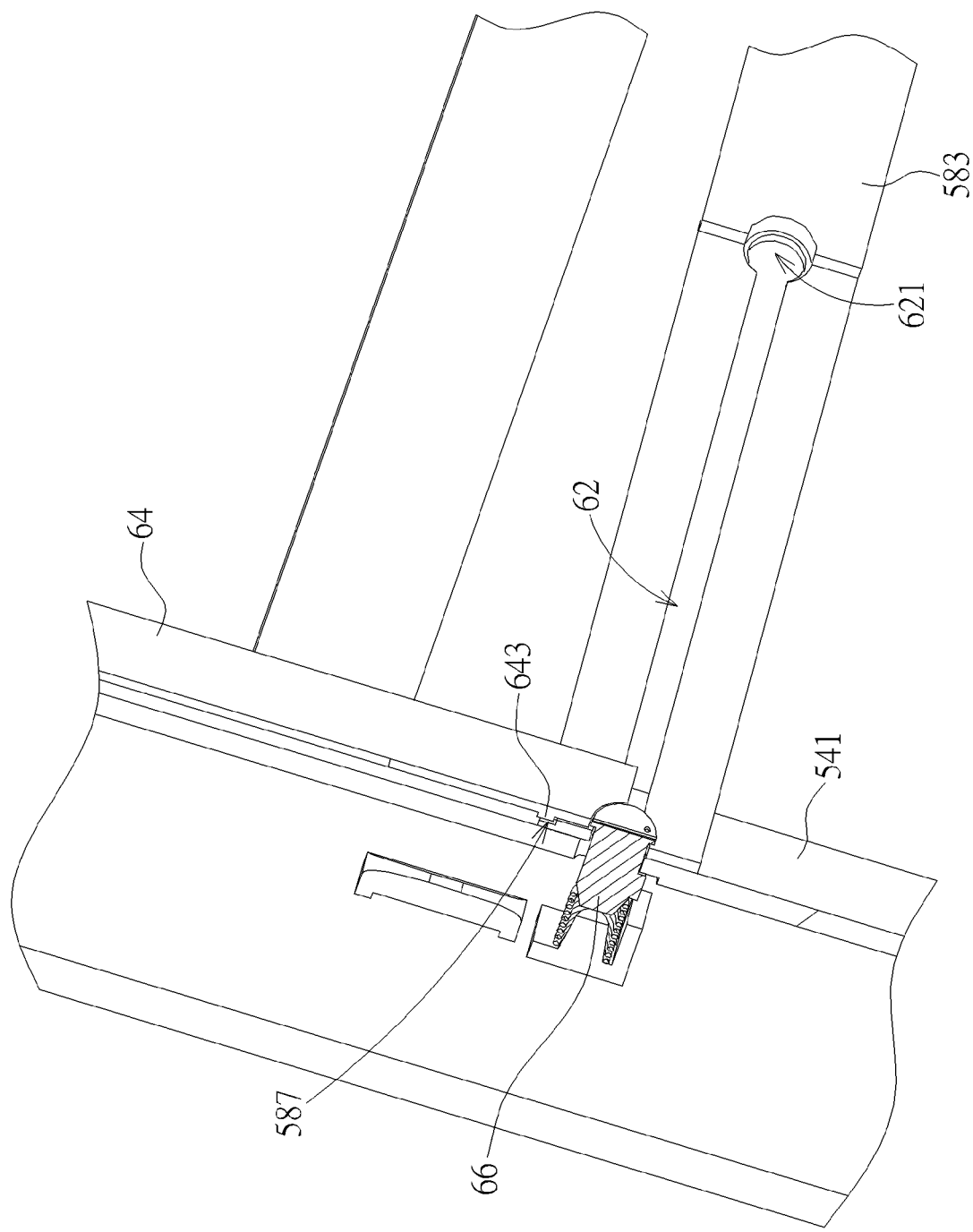
FIG. 12 is a sectional view of a frame according to the embodiment of the present invention.
Figure 13:
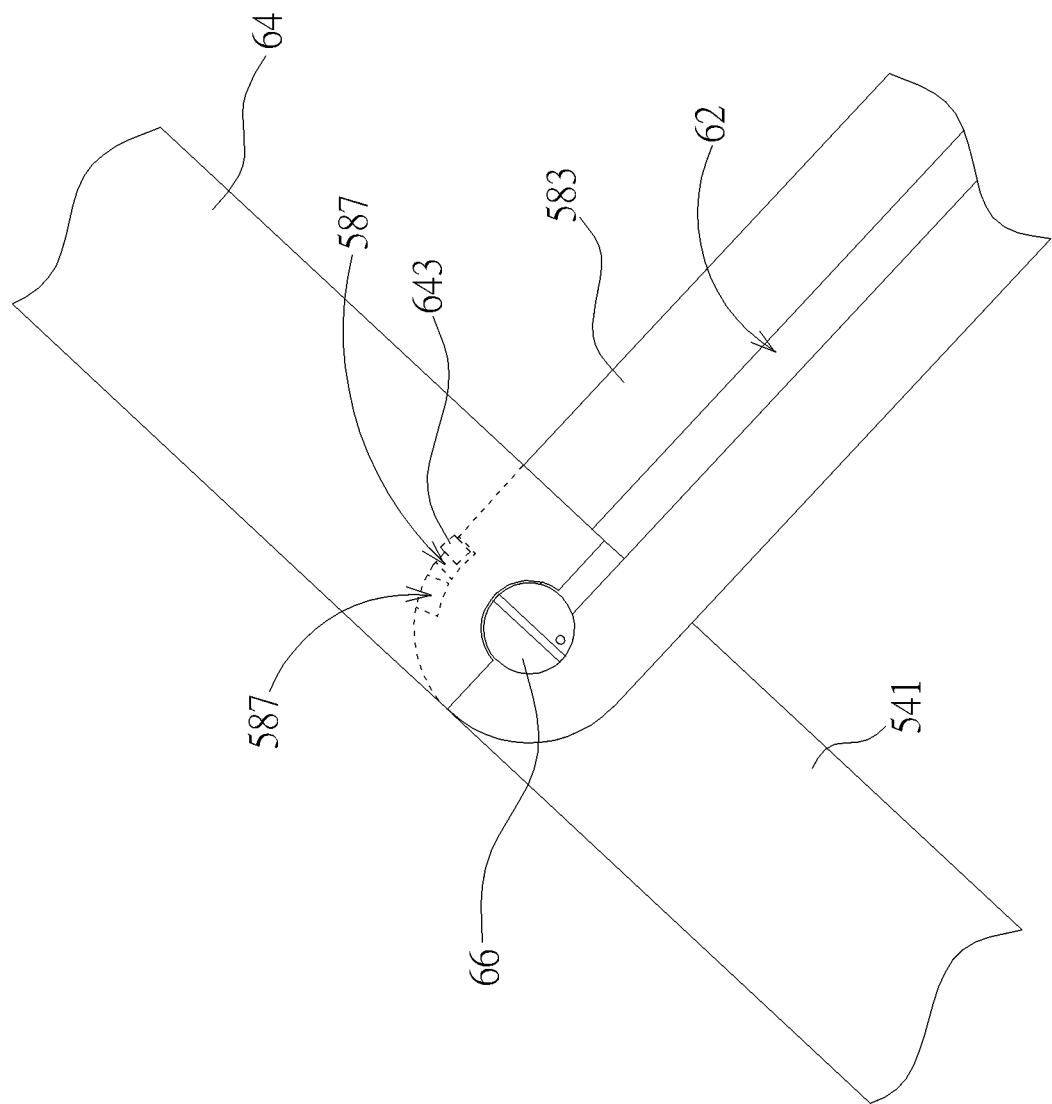
FIG. 13 is an enlarged diagram of the frame and the supporting rod according to the embodiment of the present invention.

Furthermore, please refer to FIG. 9 to FIG. 13. FIG. 12 is a sectional view of the frame 64 according to the embodiment of the present invention. FIG. 13 is an enlarged diagram of the frame 64 and the supporting rod 583 according to the embodiment of the present invention. A locating block 643 is formed on each of two sides of the frame 64, and at least one locating slot 587 corresponding to the locating block 643 is further formed on the other end of each supporting rod 583. The locating block 643 is engaged with the at least one locating slot 587 as the two supporting rods 583 rotates relative to the frame 64 to a specific angle, so as to fix the supporting rod 583 on the frame 64. The frame 64 and the supporting rod 583 can be made of resilient material, so that the locating block 643 can be deformed to switch between different locating slots. As the display module 54 is rotated relative to the host module 52 in the first rotating direction R1 and the supporting rod 583 is rotated relative to the corresponding pivoting component 66 in the second rotating direction R2, the two supporting rods 583 can rotate relative to the frame 64 to the specific angle, so as to fix the two supporting rods 583 on the frame 64. Therefore, the touch display module can be fixed at a fixing angle stably as the user performs a touch operation, so that the user has the best using experience. A position and a number of the locating slot 587 are not limited to this embodiment, and it depends on practical design demands. For example, as shown in FIG. 13, two locating slots 587 can be disposed for locating the display module 54 in different positions.

In contrast to the prior art, the portable electronic device has the supporting structure for supporting the display module on the two side portions of the display module. As the portable electronic device is in a using state, the two supporting rods of the supporting structure can rotate relative to the pivoting components, so that the supporting portion of the supporting structure contacts against the supporting surface for supporting the display module. Moreover, the sliding slot and a plurality of the locating slots are formed on each supporting rod, so that the two supporting rods can move relative to the pivoting components and rotate to be fixed in a plurality of specific angles, so as to fix the display module in the plurality of specific angles. As a result, it solves the conventional problem that the display module is pivotally connected to the host module, so that as the user touches the touch display module, the display module is swayed due to a force applied by a finger of the user, resulting in bad feeling of operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device, comprising:
   a host module;
   a display module;
   a pivoting structure connected to the host module and the display module, the pivoting structure being for pivoting the display module relative to the host module; and
   a supporting structure connected to the display module and for supporting the display module on a supporting surface, the supporting structure comprising:
      a supporting portion for contacting against the supporting surface; and
      two supporting rods, two ends of the two supporting rods being connected to two ends of the supporting portion respectively, and the other ends of the two supporting rods being rotatably connected to two side portions of the display module respectively, so that the supporting structure rotates relative to the display module, a sliding slot being formed on the other end of each supporting rod, and parts of the two side portions of the display module being installed inside the two sliding slots, so that the two supporting rods move relative to the display module.

2. The portable electronic device of claim 1, wherein two connecting holes are formed on the two side portions respectively, two perforations are formed on two ends of each sliding slot respectively, the supporting structure further comprises two pivoting components, and each pivoting component passes through the corresponding connecting hole and the corresponding perforation, so that the supporting structure slides and rotates relative to the display module.

3. The portable electronic device of claim 2, wherein an aperture is further formed on each side portion of the display module and communicated to the corresponding connecting hole, and each pivoting component comprises:
   a cylindrical portion passing through the corresponding perforation and the corresponding connecting hole;
   a stopping portion disposed on the cylindrical portion; and
   a driving portion connected to an end of the cylindrical portion, the driving portion driving the cylindrical portion and the stopping portion to pass through the corresponding perforation, so as to pass through the corresponding connecting hole and the corresponding aperture respectively after the stopping portion is aligned with the corresponding aperture.

4. The portable electronic device of claim 3, wherein a fan-shaped groove is formed on each connecting hole, after the cylindrical portion and the stopping portion pass through the corresponding connecting hole and the corresponding aperture respectively, the driving portion is for driving the cylindrical portion and the stopping portion to rotate, so that the stopping portion rotates to contact against the fan-shaped groove, so as to prevent the pivoting component from separating from the display module and the supporting rod.

5. The portable electronic device of claim 4, wherein each pivoting component further comprises a pressing portion, and the supporting structure further comprises:
   two bases disposed inside the display module, a column being disposed on each base; and
   two resilient components, each resilient component sheathing the corresponding column, each resilient component pushing the pressing portion of the corresponding pivoting component as the corresponding driving portion drives the stopping portion to rotate from the fan-shaped groove to align with the aperture, so as to separate the corresponding pivoting component from the display module and the supporting rod.

6. The portable electronic device of claim 3, wherein each pivoting component further comprises a locking portion disposed on the cylindrical portion, the supporting rod slides relative to the corresponding pivoting component as the locking portion is parallel to the corresponding sliding slot, and the supporting rod is not able to slide relative to the corresponding pivoting component as the locking portion is not parallel to the corresponding sliding slot.

7. The portable electronic device of claim 1, wherein the supporting structure further comprises a frame, and the two supporting rods are movably connected to two ends of the frame.

8. The portable electronic device of claim 7, further comprising a plurality of fixing components for fixing the frame on the display module.

9. The portable electronic device of claim 7, wherein two locating blocks are formed on the frame, at least one locating slot is further formed on the other end of each supporting rod, and the two locating blocks are engaged with the at least one locating slot of the two supporting rods respectively as the two supporting rods rotate relative to the frame to a specific angle, so as to fix the two supporting rods on the frame.

10. The portable electronic device of claim 1, wherein two engaging slots are further formed on the two supporting rods, and two engaging blocks are formed on the two side portions for engaging with the two engaging slots, so as to fix the two supporting rods on the display module.

11. The portable electronic device of claim 1, wherein the supporting structure further comprises at least one slip-resistant component installed on the supporting portion for prevent the supporting portion from slipping relative to the supporting surface.

* * * * *